J. C. MATHESON.
RESILIENT WHEEL.
APPLICATION FILED JUNE 29, 1910.
994,174.
Patented June 6, 1911.
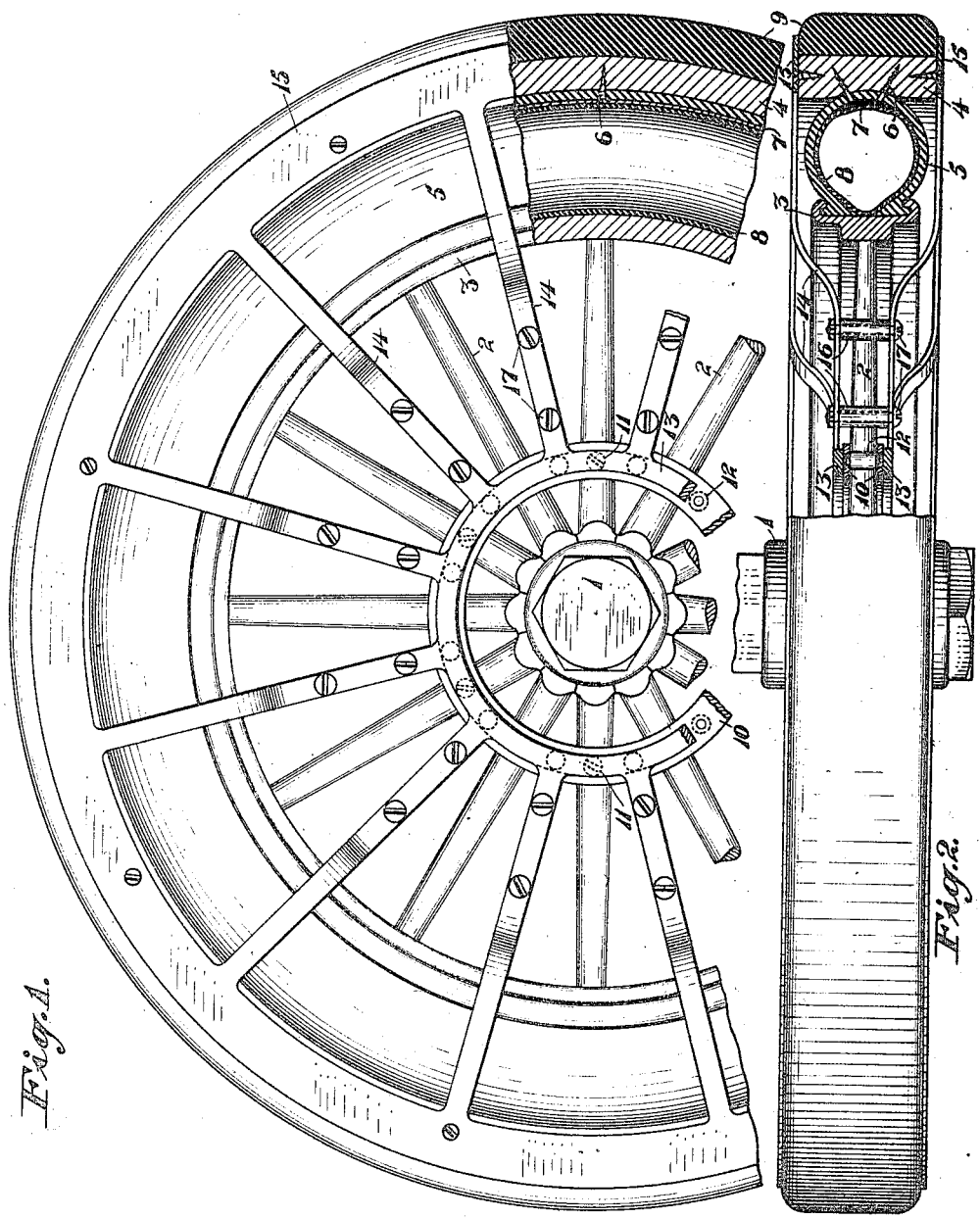
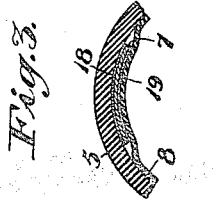
WITNESSES:
INVENTOR
John C. Matheson
BY
ATTORNEY

UNITED STATES PATENT OFFICE.

JOHN C. MATHESON, OF SAN FRANCISCO, CALIFORNIA.

RESILIENT WHEEL.

994,174.  Specification of Letters Patent.  Patented June 6, 1911.

Application filed June 29, 1910. Serial No. 569,473.

*To all whom it may concern:*

Be it known that I, JOHN C. MATHESON, a citizen of the United States, residing at San Francisco, in the county of San Francisco and State of California, have invented new and useful Improvements in Resilient Wheels, of which the following is a specification.

My invention relates to resilient wheels, the object of the invention being to provide a wheel which shall have the same resiliency as one with a pneumatic tire but without the liability to punctures attendant upon the latter construction.

In the accompanying drawing, Figure 1 is a broken side view of the wheel, showing the same partly in section; Fig. 2 is an edge view of the wheel showing the same partly in axial section; Fig. 3 is a detail sectional view of a modification.

Referring to the drawing, 1 indicates the hub of the wheel, from which radiate spokes 2, connected at their outer ends to an inner rim 3. 4 indicates an outer rim between which and the inner rim is interposed a casing 5 of an ordinary pneumatic tire, said casing being secured at suitable intervals by screws 6 to the outer rim, said screws passing through holes in a narrow metallic ring 7 within the outer casing. Within the casing 5 is an ordinary pneumatic tube 8. Upon the outer rim is secured a rubber tire 9. Rings 10 are secured by screws 11 to the sides of said spokes near their inner ends, and are connected also by spacing rivets 12, and upon or against said rings 10 can move rings 13, from which extend in a radial direction spokes 14, which are formed integral at their outer ends with rings 15, which in turn are connected to the sides of the outer rim 4. The radiating spokes 14 are arranged in pairs registering with each other and alternating with the spokes 2 of the wheel. Said pairs of spokes 14 are spaced from each other and at the same time connected together by spacing members 16 and bolts 17.

In the modification shown in detail in Fig. 3, the inner tube 8 and the casing 5 are protected from abrasion by the metallic ring 7 by inner and outer strips 19, 18, of leather or any suitable material.

By the above means there is provided a wheel having therein a pneumatic tube which is not subject to the punctures and ruptures to which the ordinary pneumatic tire is liable, and which yet possesses the same resiliency and substantially the same tractional efficiency.

I am aware that I am not the first to provide a resilient wheel in which there is interposed a pneumatic annular tube between inner and outer rims. My improvement consists in the details of construction by which such a wheel is rendered effective and practical. This I accomplish by fixedly securing the casing of the pneumatic tire to the tire. So far as I am aware I am the first to so fixedly secure such casing.

The construction by which the hub and spokes radiating therefrom can move relatively to the rim of the wheel and at the same time resist side strains and lateral deflection or buckling of the wheel is also an important feature of my invention.

I claim:—

In a resilient wheel, the combination of a hub, spokes radiating therefrom, an inner rim secured upon the ends of said spokes, two rings secured to said spokes, one on each side thereof, inner and outer movable rings, and movable radial spokes on each side of the wheel, the movable spokes being formed integral with said inner and outer movable rings, spacing members for the movable spokes on opposite sides of said wheel and bolts connecting said spokes, an outer rim connected to the outer movable rings, a pneumatic tube between the inner and outer rims, and a casing around said tube, the inner and outer sides of said casing being connected respectively to said inner and outer rims, substantially as described.

In testimony whereof I have hereunto set my hand in the presence of two subscribing witnesses.

JOHN C. MATHESON.

Witnesses:
 FRANCIS M. WRIGHT,
 D. B. RICHARDS.